United States Patent
Bekavac

(10) Patent No.: US 10,044,245 B2
(45) Date of Patent: Aug. 7, 2018

(54) ELECTRIC MOTOR WITH IMPROVED COOLING

(71) Applicant: Robert Bosch GmbH, Stuttgart (DE)

(72) Inventor: Miro Bekavac, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 507 days.

(21) Appl. No.: 14/248,612

(22) Filed: Apr. 9, 2014

(65) Prior Publication Data
US 2014/0339930 A1    Nov. 20, 2014

(30) Foreign Application Priority Data

May 16, 2013  (DE) .................. 10 2013 209 061

(51) Int. Cl.
| | |
|---|---|
| H02K 9/04 | (2006.01) |
| H02K 7/14 | (2006.01) |
| B25F 5/00 | (2006.01) |
| H02K 11/028 | (2016.01) |
| H02K 13/10 | (2006.01) |
| H02K 15/00 | (2006.01) |

(52) U.S. Cl.
CPC ............. *H02K 9/04* (2013.01); *B25F 5/008* (2013.01); *H02K 7/145* (2013.01); *H02K 11/028* (2013.01); *H02K 13/105* (2013.01); *H02K 15/0068* (2013.01)

(58) Field of Classification Search
CPC ........ H02K 7/145; H02K 9/04; H02K 11/028; H02K 13/105; H02K 15/0068; B25F 5/008
USPC ..................................... 310/50, 59
See application file for complete search history.

(56) References Cited

U.S. PATENT DOCUMENTS

| | | | |
|---|---|---|---|
| 3,643,119 A | 2/1972 | Lukens | |
| 7,359,194 B2* | 4/2008 | Krauter | B25F 5/008 310/50 |
| 8,283,817 B2* | 10/2012 | Deeg | H02K 9/06 310/52 |
| 2005/0062351 A1* | 3/2005 | Berwert | H02K 3/50 310/90 |
| 2011/0175468 A1 | 7/2011 | Dutau | |

FOREIGN PATENT DOCUMENTS

| | | |
|---|---|---|
| CN | 201766458 | 3/2011 |
| CN | 202721558 | 2/2013 |
| DE | 39 42 083 A1 | 6/1991 |
| DE | 69816512 | 4/2004 |
| DE | 10261572 | 7/2004 |

OTHER PUBLICATIONS

Translation of foreign Patent document CN 201766458 (Year: 2011).*

* cited by examiner

*Primary Examiner* — Alex W Mok
(74) *Attorney, Agent, or Firm* — Norton Rose Fulbright US LLP; Gerard Messina

(57) ABSTRACT

An electric motor includes a stator and a rotor. The rotor includes a motor shaft, at least one radial fan and at least one axial fan being non-rotatably situated on the motor shaft for motor cooling. The radial fan is situated in the area of one axial end of the motor shaft and the axial fan is situated in the area of a diametrically opposed axial end of the motor shaft.

9 Claims, 3 Drawing Sheets

ELECTRIC MOTOR WITH IMPROVED COOLING

FIELD OF THE INVENTION

The present invention relates to an electric motor including a stator and a rotor, the rotor including a motor shaft, with at least one radial fan and at least one axial fan being non-rotatably situated on the motor shaft with improved motor cooling.

BACKGROUND

An electric motor including a stator and a rotor, the motor shaft of which has a radial fan and an axial fan, is known from DE 39 42 083 A1. These fans are non-rotatably attached to the motor shaft and are spatially positioned directly one behind the other, the axial fan being positioned directly in front of the radial fan on the intake side.

SUMMARY

A disadvantage of the arrangement described in DE 39 42 083 A1 is that a cooling air flow generated by the radial fan and the axial fan produces only inadequate motor cooling, in particular in the case of high motor power or loading. In this context, primarily internal motor components, such as a motor winding of the electric motor, may, if necessary, not be adequately cooled. In continuous operation of the electric motor, this may result in damage to the motor.

An object of the present invention is therefore to provide a novel electric motor that includes a radial fan and an axial fan, in which improved motor cooling may be made possible.

This problem is solved by an electric motor including a stator and a rotor, the rotor including a motor shaft, with at least one radial fan and at least one axial fan being non-rotatably situated on the motor shaft for motor cooling. The radial fan is situated in the area of one axial end of the motor shaft and the axial fan is situated in the area of a diametrically opposed axial end of the motor shaft.

The present invention thus makes it possible to provide an electric motor with a radial fan and an axial fan, it being possible to generate a comparatively greater volume flow of cooling air for motor cooling and consequently improved motor cooling by positioning the radial fan and the axial fan in the area of diametrically opposed axial ends of the stator or rotor.

According to an example embodiment of the present invention, a pressure side of the axial fan preferably faces an intake side of the radial fan.

A common operating direction of the axial fan and the radial fan is thus made possible in a simple manner.

Preferably, the axial fan is designed for generating at least one first cooling air flow for flow through a motor interior, and the radial fan is designed for generating at least one second cooling air flow, which is designed for at least partially reinforcing the first cooling air flow and/or for a flow around the electric motor.

This makes it possible to generate a comparatively large air movement for cooling the electric motor in the motor interior and in the area of a corresponding external circumference of the electric motor.

According to one example embodiment, the axial fan is at least section-wise situated in a first housing component.

Example embodiments of the present invention thus make it possible to provide an electric motor in which the axial fan may be fixed in the motor interior in a simple manner with the aid of the first housing component.

Preferably, the first housing component includes at least one air intake opening for the entry of air for generating the first cooling air flow.

This makes it possible for the first cooling air flow to enter the motor interior at precisely predefined intake locations.

Preferably, a second housing component is situated on a side of the radial fan facing the first housing component, a diameter of the first and second housing components being smaller than that of the radial fan.

This makes additionally improved cooling of the electric motor possible, since the first cooling air flow is able to cool the motor interior and the second cooling air flow is able to cool the external circumference of the electric motor.

Preferably, the second housing component includes at least one air outlet opening for the exit of the first cooling air flow.

This makes it possible for the first cooling air flow to exit the motor interior at precisely predefined outlet locations.

According to one example embodiment, the first housing component and/or the second housing component includes/include at least one recess, via which the first housing component and/or the second housing component is/are non-rotatably situated on at least one holding bar provided on the stator, the first and/or the second housing component being force-fit to the stator by press-fitting, gluing, and/or welding.

This makes a stable and robust attachment of the first housing component and/or the second housing component on the stator possible.

According to an example embodiment, the at least one axial fan is preferably situated in the area of a drive side and the at least one radial fan is preferably situated in the area of an output side of the electric motor.

This makes reliable and effective cooling of the electric motor formed between the drive side and the output side possible.

According to one example embodiment, the electric motor is designed in the manner of an electronically commutated motor.

This makes improved motor cooling according to the present invention possible in a simple manner, even in the case of electronically commutated motors.

Furthermore, the above-named problem is also solved by a hand-held power tool that includes an electric motor including a stator and a rotor, the rotor including a motor shaft, at least one radial fan and at least one axial fan being non-rotatably situated on the motor shaft for motor cooling, the radial fan being situated in the area of one axial end of the motor shaft and the axial fan being situated in the area of a diametrically opposed axial end of the motor shaft.

The present invention is elucidated in greater detail in the following description based on example embodiments represented in the drawings.

DETAILED DESCRIPTION

Figure 1:
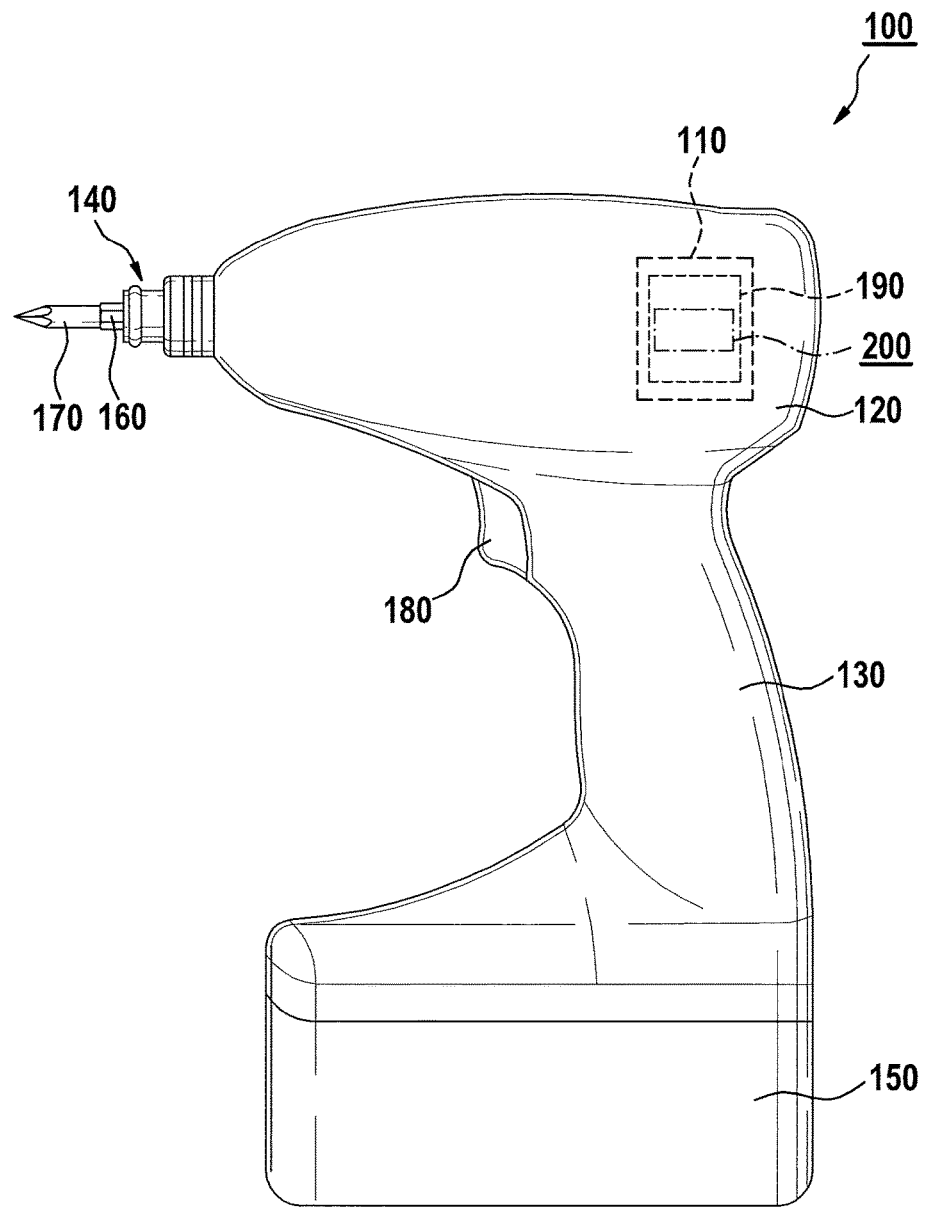
FIG. 1 shows a schematic view of a hand-held power tool that includes an electric motor according to an example embodiment of the present invention.

FIG. 1 shows a hand-held power tool 100, which is, for example, designed in the manner of a power tool that includes an electric motor 110, which makes improved motor cooling possible. The electric motor 110 includes a stator 190 and a rotor 200, configured according to an example embodiment of the present invention. Moreover, power tool 100 includes by way of illustration a tool housing 120. The tool housing 120 includes a handle 130 and a tool holder 140, and is, for example, mechanically and electrically connected to a battery pack 150 for network-independent power supply.

Power tool 100 is in this case designed as, for example, a cordless screwdriver. However, the present invention is not limited to cordless screwdrivers, but may instead be implemented in different power tools in which electric motor 110 is usable, for example, in a percussion drill, a screwdriver, a combi drill, an impact drill, a saw, a milling machine, a grinder, a garden tool, etc., regardless of whether the particular power tool is operable network-independently using a battery pack 150 or network-dependently. In particular, the present invention may also be used in power tools in which structural design measures are used to prevent intake air from flowing around the outer side of electric motor 110 in tool housing 120. In such power tools, an improvement of the motor cooling of electric motor 110 may be achieved in that a particular air flow rate through electric motor 110 is increased by rotor 200 described in FIGS. 2 and 3 by reducing a corresponding restriction effect.

Electric motor 110 is, for example, situated in tool housing 120 and is by way of illustration designed in the manner of an internal rotor motor, in which rotor 200 forms an internal rotor and stator 190 forms an external stator. However, it may alternatively be designed in the manner of an external rotor motor. Internal rotor motor 110 may, for example, be activated via a manual switch 180, i.e., it may be switched on and off, and may, for example, be designed as an electronically commutated motor or as a brushed or commutator motor. Preferably, internal rotor motor 110 may be electronically controlled or regulated in such a way that a reverse operation, and specifications with regard to a desired rotational speed and/or a torque, are implementable.

Tool holder 140 is preferably designed for accommodating insertion tools, and according to one specific embodiment, is connectable to both an insertion tool that includes an external coupling, for example, a screwdriver bit, as well as to an insertion tool that includes an internal coupling, e.g., a socket key. By way of illustration, tool holder 140 is connectable to an insertion tool 170 that includes an external polygonal coupling 160 or to an insertion tool that includes an internal polygonal coupling. Insertion tool 170 is, for example, formed as a screwdriver bit that includes external polygonal coupling 160 which is designed by way of illustration as a hexagonal coupling, which is situated in tool holder 140. Such a screwdriver bit is sufficiently known from the related art, so that a detailed description is omitted here for the purpose of brevity of the description.

Figure 2:
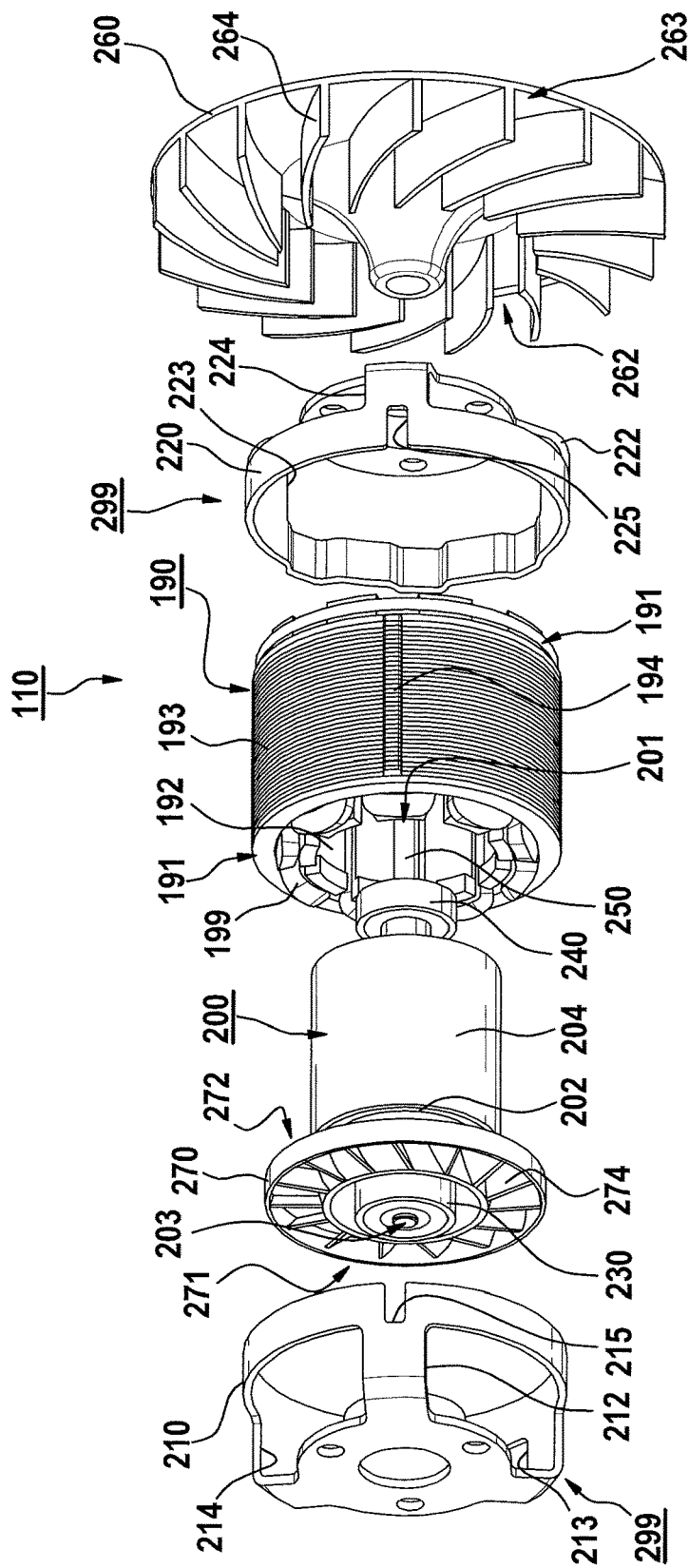
FIG. 2 shows an exploded view of the electric motor of FIG. 1, according to an example embodiment of the present invention.

FIG. 2 shows an example assembly of internal rotor motor 110 of FIG. 1. The rotor motor 110 includes internal rotor 200 and external stator 190, which by way of illustration includes a segmented stator core 193 constructed from sheet metal lamellas including nine stator segments, on each of which a respective associated winding is provided. For example, one of the stator segments is denoted by reference numeral 192 and one of the windings by reference numeral 199. However, the depiction of nine stator segments is only an example and should not be construed as limiting the present invention, which may be used with any number of stator segments. Furthermore, the segmented design of stator core 193 is only exemplary, and alternatively, it may also be formed as an unsegmented stator core, e.g., it may be formed in the manner of a laminated sheet package or a stator core formed from soft iron.

Figure 3:
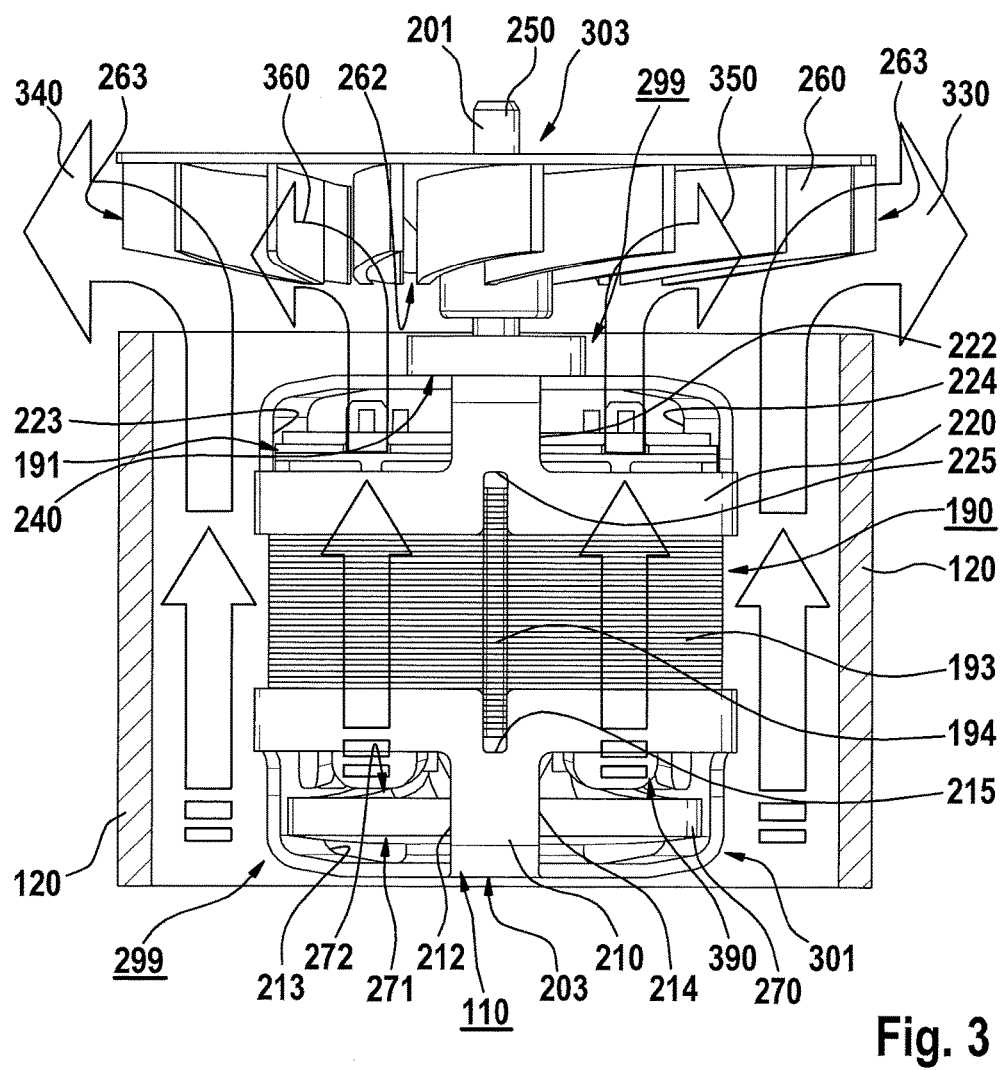
FIG. 3 shows a partially sectioned and a partial perspective view of the electric motor of FIGS. 1 and 2, according to an example embodiment of the present invention.

External stator 190 includes, for example, at least one, and by way of illustration, two insulators 191, each of which is slid axially onto stator core 193, and is designed for enclosing internal rotor 200 annularly, at least section-wise, after assembly, as illustrated in FIG. 3. According to one example embodiment, internal rotor 200 includes a motor shaft 250, which is provided with a rotor core 202 and a rotor magnet 204. Rotor core 202 is preferably formed from a material with a preferably low magnetic resistance, for example, using a laminated sheet package, or using a soft iron core. By way of illustration, rotor magnet 204 is a hollow cylindrical permanent magnet which is preferably designed in the manner of an annular magnet. However, rotor magnet 204 may be designed as a segmented shell magnet, a rectangular magnet, or in any other form. Motor shaft 250 is preferably formed from steel; however, it may also include any other material or be formed from it.

Preferably, motor shaft 250 is rotatably supported on a motor housing 299 of internal rotor motor 110 via a first bearing element 230 and a second bearing element 240, as described below. Bearing elements 230, 240 are, for example, formed in the manner of roller bearings and pressed onto motor shaft 250. Motor housing 299 includes, for example, at least one first housing component 210 and at least one second housing component 220; however, it may alternatively be formed as a single piece or in more than two pieces.

According to one example embodiment, at least one radial fan wheel 260 denoted in the following as a radial fan, and at least one axial fan wheel 270 denoted in the following as an axial fan, are non-rotatably situated on motor shaft 250 for motor cooling. The at least one axial fan 270 is, for example, non-rotatably situated in the area of an axial end 203 of motor shaft 250 or of external stator 190, and is fixed in its axial position there by first bearing element 230. The at least one radial fan 260 is provided for preferably an at least form-fit position in the area of a diametrically opposed axial end 201 of motor shaft 250. In this case, the at least one axial fan 270 and the at least one radial fan 260 may be randomly spaced from particular axial ends 203 and 201. Furthermore, additional components for transferring a torque generated by electric motor 110 may be situated in the area of the axial end 201 of motor shaft 250 on which radial fan 260 is situated, or axial end 201 may be designed for transferring the generated torque, for example, to a downstream transmission.

Radial fan 260 and axial fan 270 each includes an intake side 262 and 271, a pressure side 263 and 272, and at least one (and preferably a plurality) of air guide vane 264 and 274. Preferably, pressure side 272 of axial fan 270 faces intake side 262 of radial fan 260, i.e., axial fan 270 is provided for generating an air flow (350, 360 in FIG. 3) in the direction of radial fan 260, which is designed for at least partially drawing in the air flow generated by axial fan 270 and consequently reinforcing it, as described below in FIG. 3. In addition, a further improvement in the motor cooling may be achieved with the aid of a suitable combination of the number, size, and shape of the at least one or the plurality of air guide vanes 264, 274 of axial fan 260 and radial fan 270.

Axial fan 270 is by way of illustration situated at least section-wise in first housing component 210, and second housing component 220 is situated in the area of intake side 262 or a side of radial fan 260 facing first housing component 210. Here, the external diameter of first and second housing components 210, 220 is preferably smaller than that of radial fan 260.

By way of illustration, at least one recess 215 and 225 is provided on first and second housing component 210, 220, it being possible for the recess to be formed in any shape and length on first housing component 210 and/or second housing component 220. Furthermore, the at least one recess 215, 225 is provided for fixing first housing component 210 and/or second housing component 220 non-rotatably on at least one holding bar 194 formed on stator core 193. Furthermore, first and/or second housing component 210 or 220 is/are preferably attached to stator core 193 by a force-fit joint, for example, by press-fitting, gluing, and/or welding.

Preferably, first housing component 210 includes at least one air intake opening 212, 213, 214 and second housing section 220 includes at least one air outlet opening 222, 223, 224. Preferably, a plurality of air intake openings 212, 213, 214 and air outlet openings 222, 223, 224 are provided. By way of illustration, three air intake openings 212, 213, 214 or air outlet openings 222, 223, 224 are formed.

FIG. 3 shows internal rotor motor 110 of FIGS. 1 and 2 provided with motor housing 299 of FIG. 2 in the mounted state, the motor being situated by way of illustration in tool housing 120 of hand-held power tool 100 of FIG. 1. FIG. 3 illustrates the positioning of axial fan 270 of FIG. 2 in the area of axial end 203 of motor shaft 250 of FIG. 2, which, for example, forms a drive side 301 of internal rotor motor 110, while diametrically opposed axial end 201 of motor shaft 250 forms, for example, an output side 303 of internal rotor motor 110, on which radial fan 260 is situated.

During operation of internal rotor motor 110, axial fan 270 generates at least one first cooling air flow 350, 360. By way of illustration, this cooling air flow passes through air intake openings 212, 213, 214 of first housing component 210 into motor interior 390, which is enclosed by motor housing 299 in the manner of a cage, and again exits motor housing 299 through air outlet openings 222, 223, 224 of second housing component 220. This results in a cooling of motor interior 390.

Furthermore, radial fan 260 generates at least one second cooling air flow 330, 340. Since the external diameter of radial fan 260 is larger than the external diameter of first and second housing components 210, 220, and accordingly of motor housing 299 and stator core 193, second cooling air flow 330, 340 flows by way of illustration around internal rotor motor 110 on its external circumference. Additionally or alternatively, radial fan 260 may be designed for at least partially reinforcing first cooling air flow 350, 360 by intake of this first cooling air flow 350, 360.

What is claimed is:

1. An electric motor comprising:
    a stator;
    a rotor that includes a rotor core and a motor shaft, the motor shaft having a first axial end and a second axial end, the second axial end opposite the first axial end;
    a radial fan non-rotatably situated on the motor shaft behind the rotor core and a second bearing element in an area of the first axial end at an output side of the electric motor;
    an axial fan non-rotatably situated on the motor shaft adjacent a first bearing element and the rotor core in an area of the second axial end at a drive side of the electric motor;
    a first housing component in which the axial fan is situated;
    a second housing component situated on a side of the radial fan facing the first housing component, wherein a diameter of the first and second housing components is smaller than an external diameter of the radial fan;
    wherein the axial fan is fixed in its axial position by the first bearing element,
    wherein the radial and axial fans are configured for providing motor cooling,
    wherein the first and second housing components include at least one respective recess via which the first and second housing components are non-rotatably situated on at least one holding bar provided on the stator, the first and second housing components being force-fit to the stator by at least one of press-fitting, gluing, and welding.

2. The electric motor of claim 1, wherein a pressure side of the axial fan faces an intake side of the radial fan.

3. The electric motor of claim 1, wherein the first housing component includes at least one air intake opening for the entry of air for generating the at least one first cooling air flow.

4. The electric motor of claim 3, further comprising a second housing component situated on a side of the radial fan facing the first housing component, wherein a diameter of the first and second housing components is smaller than an external diameter of the radial fan.

5. The electric motor of claim 4, wherein the second housing component includes at least one air outlet opening for the exit of the at least one first cooling air flow.

6. The electric motor of claim 1, wherein the electric motor is an electronically commutated motor.

7. An electric motor comprising:
    a stator;
    a rotor that includes a rotor core and a motor shaft, the motor shaft having a first axial end and a second axial end, the second axial end opposite the first axial end;
    a radial fan non-rotatably situated on the motor shaft behind the rotor core and a second bearing element in an area of the first axial end at an output side of the electric motor;
    an axial fan non-rotatably situated on the motor shaft adjacent a first bearing element and the rotor core in an area of the second axial end at a drive side of the electric motor; and
    a first housing component in which the axial fan is situated;
    wherein the axial fan is fixed in its axial position by the first bearing element,
    wherein the radial and axial fans are configured for providing motor cooling,
    wherein the first housing component includes at least one recess via which the first housing component is non-rotatably situated on at least one holding bar provided on the stator, the first housing component being force-fit to the stator by at least one of press-fitting, gluing, and welding.

8. The electric motor of claim 7, further comprising a second housing component situated on a side of the radial fan facing the first housing component, wherein a diameter of the first and second housing components is smaller than an external diameter of the radial fan.

9. A hand-held power tool comprising an electric motor, the electric motor comprising:
- a stator;
- a rotor that includes a rotor core and a motor shaft, the motor shaft having a first axial end and a second axial end, the second axial end opposite the first axial end;
- a radial fan non-rotatably situated on the motor shaft behind the rotor core and a second bearing element in an area of the first axial end at an output side of the electric motor;
- an axial fan non-rotatably situated on the motor shaft adjacent a first bearing element and the rotor core in an area of the second axial end at a drive side of the electric motor; and
- a first housing component in which the axial fan is situated,
- wherein the radial and axial fans are configured for providing motor cooling,
- wherein the first housing component includes at least one recess via which the first housing component is non-rotatably situated on at least one holding bar provided on the stator, the first housing component being force-fit to the stator by at least one of press-fitting, gluing, and welding.

* * * * *